(12) United States Patent
Willer

(10) Patent No.: US 9,112,349 B2
(45) Date of Patent: Aug. 18, 2015

(54) ELECTROMECHANICAL EXCESS TEMPERATURE PROTECTION ELEMENT

(71) Applicant: Topinno GmbH, Aachen (DE)

(72) Inventor: Bernd Willer, Moosburg (DE)

(73) Assignee: TOPINNO GMBH, Aachen (DE)

( * ) Notice: Subject to any disclaimer, the term of this patent is extended or adjusted under 35 U.S.C. 154(b) by 164 days.

(21) Appl. No.: 13/760,375

(22) Filed: Feb. 6, 2013

(65) Prior Publication Data

US 2013/0170088 A1    Jul. 4, 2013

Related U.S. Application Data

(63) Continuation of application No. PCT/DE2011/075178, filed on Jul. 25, 2011.

(30) Foreign Application Priority Data

Aug. 6, 2010 (DE) .......................... 10 2010 036 886
Aug. 13, 2010 (DE) ...................... 20 2010 008 276 U
Aug. 16, 2010 (DE) .......................... 10 2010 037 014

(51) Int. Cl.
*H02H 5/04* (2006.01)
*H01H 37/76* (2006.01)

(52) U.S. Cl.
CPC ................. *H02H 5/04* (2013.01); *H01H 37/76* (2013.01); *H01H 37/765* (2013.01)

(58) Field of Classification Search
CPC ........ H02H 5/04; H01H 37/76; H01H 37/765
See application file for complete search history.

(56) References Cited

U.S. PATENT DOCUMENTS

| 4,044,326 A | * | 8/1977 | Rodrigues ..................... 337/248 |
| 4,352,082 A | * | 9/1982 | Barry et al. .................... 337/409 |
| 5,014,036 A | * | 5/1991 | Komoto ......................... 337/407 |
| 5,053,634 A | * | 10/1991 | Kakinuma ....................... 307/9.1 |
| 5,831,507 A | * | 11/1998 | Kasamatsu et al. ............... 337/4 |

FOREIGN PATENT DOCUMENTS

| DE | 10226357 A1 | 1/2004 |
| DE | 202006007613 U1 | 8/2006 |
| DE | 102008027189 A1 | 1/2009 |
| WO | 2007014816 A1 | 2/2007 |

* cited by examiner

*Primary Examiner* — Zeev V Kitov
(74) *Attorney, Agent, or Firm* — Patricia M. Mathers

(57) ABSTRACT

The invention is an excess temperature protection element for photovoltaic installations. The element has a cylindrical housing closed off with two cover plates, encasing therein a plug-and-socket connection that is certified for photovoltaic installations. The plug connector is connected to the interior face of one cover plate and the socket connector to the interior face of the second cover plate, so that the two connectors are in electrical contact with each other when the housing is closed. A pressure element between the two cover plates biases the plates away from the housing. One of the plates is a releasable plate secured to the housing by a hot-melt material. When the temperature of the PV installation rises above a threshold value, the hot-melt material softens, allowing the pressure element to push the releasable cover plate away from the housing, thereby disconnecting the plug-in connection in the housing.

9 Claims, 1 Drawing Sheet

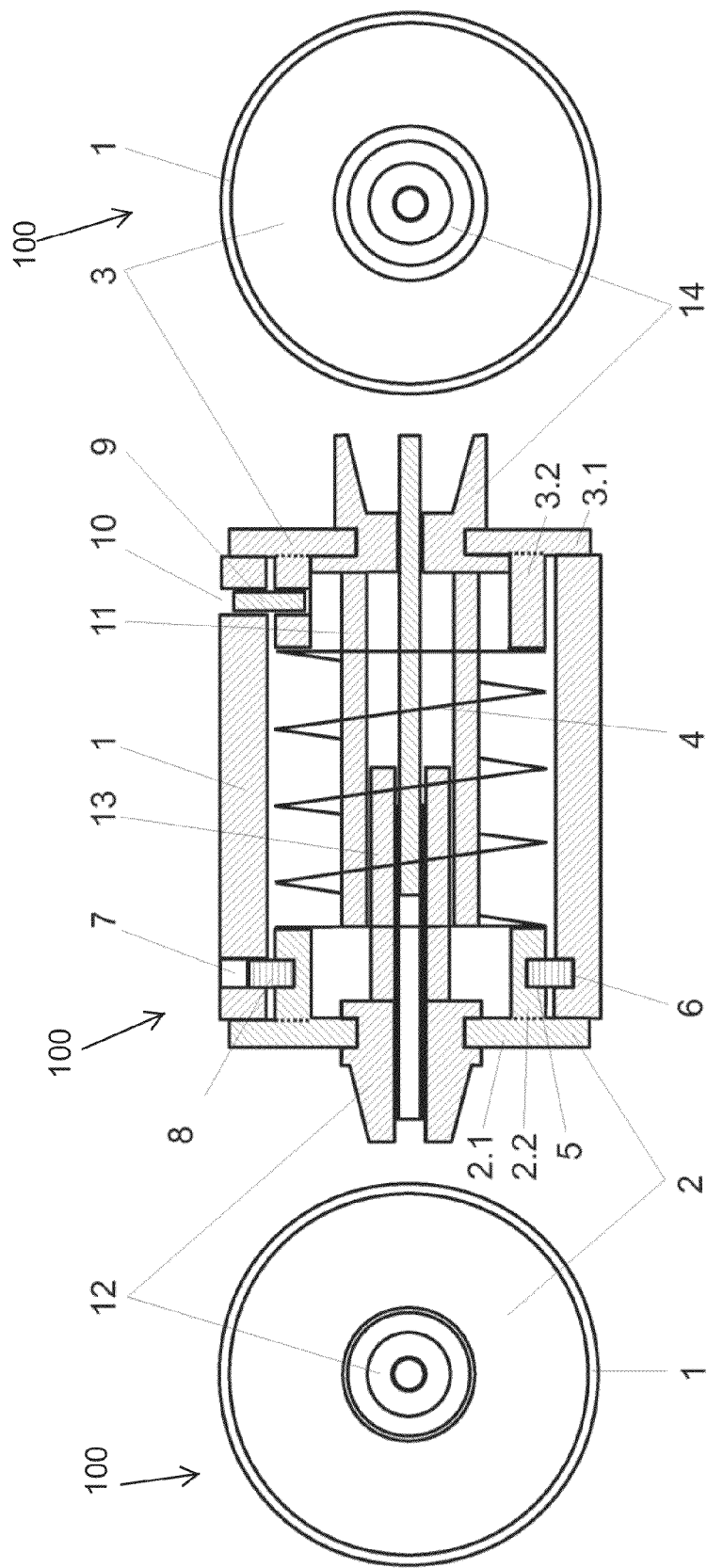

ELECTROMECHANICAL EXCESS TEMPERATURE PROTECTION ELEMENT

BACKGROUND INFORMATION

1. Field of the Invention

The invention relates to an excess temperature protection element that is particularly suited for photovoltaic systems, but may also be used in other free wired electrical systems in interior and exterior areas.

2. Discussion of the Prior Art

In photovoltaic systems, an excess temperature protection element serves to electrically disconnect individual photovoltaic modules in hazardous situations. This excess temperature protection element also meets all electrical and safety technical requirements demanded of connector elements certified for operation in photovoltaic systems. The individual photovoltaic modules are usually series connected. At the end of the chain or string of modules, voltages of up to 1000 V DC voltage and currents of 8 to 16 A may occur when the sunlight is strong. Hazardous situations can arise, such as a fire on a roof structure on which a photovoltaic system is installed, or a collision of a motor vehicle with a PV system in an open field. Such situations pose an acute risk for emergency personnel or persons involved in the accident, should they come into contact with life-threatening levels of electric voltages or currents in the modules.

Currently, safety precautions for photovoltaic systems in the open field are limited to a requirement that they be enclosed by a fence. Thus far, there are no safety precautions for rooftop installations, because these are difficult to reach anyway.

Risk of injury to persons due to electric shock from photovoltaic systems, or in the worst case scenario, even death is rising, however, because of a steady increase in the number and size of photovoltaic systems. Thus, it is necessary to provide additional safety measures for the operation of photovoltaic systems.

The prior art provides few solutions that have the goal of reducing the risk of electric shock by photovoltaic systems, or which may at least be used for this purpose.

A safety device described in U.S. Pat. No. 4,380,001 A interrupts an electrical connection when a current or a temperature is exceeded. For this purpose a fusible wire element and a temperature-sensitive element are accommodated in separate chambers in a housing. Both elements are series connected. The temperature-sensitive element may be constructed either as a solder metal coated with pine resin or as a bimetal thermostat switch. When a critical temperature is exceeded, the solder melts and the thermostat switch opens.

Although the safety device is in principle able to open circuits, even in case of a temperature rise resulting from a fire, it is not possible to achieve a safe and permanent isolation of voltages of up to 1000 V with the fuse device or thermostat switch.

JP 11040838 A recommends switching a temperature safety unit into the outgoing line of photovoltaic modules with the goal of reducing the risk of electric shock for emergency or service personnel after a fire. The mode of operation of the temperature safety unit is not described in any detail. Because of the high voltages that may occur, the isolating distance would have to be relatively large, to avoid any sparking or arc-overs when separating the photovoltaic systems. Nowhere in the publication, however, is there a discussion of how such an isolation distance may be achieved in the temperature safety unit. Furthermore, both safety devices mentioned above have the disadvantage that they cannot be activated by a blow or an impact applied by emergency staff, as is often necessary in rescue missions.

DE 10 2008 027 189 A1 introduces an excess temperature protection element for photovoltaic systems that isolates individual photovoltaic modules from each other in situations of danger. The excess temperature protection element comprises a two-part safety body in which a disconnectible electric connecting element comprising a connector pin and socket, as well as a pre-stressed pressure spring, are arranged. Preferably, the two parts of the safety body have an opening on one side, wherein the opening of one part is expanded, and the other part is plugged into the expanded opening on the open side thereof. The exterior wall of the plugged in part is soldered onto the interior wall of the expanded part, to prevent the pressure spring from pushing the two components apart.

The excess temperature protection element safely isolates the photovoltaic modules from each other during a fire, but it is not possible to mechanically deactivate the modules. The solder joint connecting the two parts of the safety body is, however, subjected to environmental influences, such as temperature fluctuations, moisture, and UV radiation, in addition to the high, continuous forces caused by the spring, and, as a result, the solder joint often dissolves after only several months, leading to an uncontrolled and undesired shut-down of the photovoltaic modules.

What is needed, therefore, is a excess temperature protection element that eliminates the disadvantages of the prior art.

BRIEF SUMMARY OF THE INVENTION

The invention is an excess temperature protection element for photovoltaic systems or other freely wired electrical systems, which safely effects a permanent electric isolation of the individual photovoltaic modules, when a temperature threshold is exceeded, e.g., in case of fire, or when a mechanical force or impact is applied to it. The excess temperature protection element, however, prevents any undesired shut-offs. The excess temperature protection element additionally meets all electric and safety technical specifications required of connector elements that are rated for use in photovoltaic systems.

The electromechanical excess temperature protection element for photovoltaic systems, and also for use with other freely wired electric systems in interior and exterior areas, has a plug-in connector rated for photovoltaic systems. The connector comprises a socket and a plug, as well as a housing that coaxially encases the plug-in connector. The housing is a tube element, the end faces of which are closed by means of cover plates. A pre-stressed pressure element, such as a spiral spring, is clamped between the two cover plates within the housing, and exerts an outward pressure on the cover plates.

According to the invention the plug is attached to one cover plate on the side facing the housing interior and the socket of the plug-in connection attached to the other cover plate. Connector elements are provided on the exterior sides of the cover plates and are electrically connected to the socket or the plug, respectively. The geometry of the housing is adapted to the plug-in connector such that, when the housing is closed, the plug-in connector is electrically connected. As soon as the housing is opened, for example, when the pressure element pushes at least one of the cover plates away from the housing or tube element the plug-in connector is also pulled apart and the electrical contact is interrupted.

When the housing is closed and viewed in longitudinal direction of the housing, at least one of the cover plates has at least a first section, in which the geometry of the end face of the cover plate is large enough so that the first section completely covers the opening at the end face of the housing. Typically, the size of the end face of the cover plate is selected to be approximately equal to the exterior diameter of the housing. The cover plate has a second section, a sidewall, on the side facing the housing, whereby the size of the sidewall is just slightly smaller than the clearance diameter of the housing, so that this second section may be inserted into the tube element. The second section is dimensioned such, that no air gap of significant size is created between the side wall and the interior circumference of the housing.

At least one of the cover plates is a releasable or detachable plate. This is achieved by providing a first recess in the sidewall of the second section of the cover plate and also in the interior side of the housing. The recess in the sidewall of the second section is located opposite of the recess in the interior side of the housing, such that the two recesses form a hollow space or groove. An opening is provided in the wall of the housing that extends into the hollow space. This hollow space may be filled with a melting material through the opening, the melting material having a melting point between 120 to 250 degrees C. Suitable melting materials are, for example, commercial hot-melt adhesives made from polyamide. These materials have the advantage that they are largely resistant to the elements when exposed to weather, and, in particular, are more resistant than many metals, such as solder tin.

As long as the melting material in the groove is solid, the cover plate is prevented from being pushed out from the tube element, despite the spring force exerted upon it. In case of fire the melting material softens, the cover plate is pushed out from the tube element, and the plug-in connector is isolated. The excess temperature protection element according to the invention ensures that any malfunctions are practically excluded, because the melting material is held in the interior of the housing and is, therefore, well protected from exposure to weather.

In a preferred embodiment the housing is a tube element with a circular cross-section. The recesses in the side wall of the second section and in the interior side of the tube element are each formed as a circumferential groove, which may be filled with the hot-melt adhesive via the opening in the tube element. The opening may be a simple bore hole through the housing wall. The solidified hot-melt adhesive essentially forms an O-ring, which, as long as the hot-melt adhesive remains solid, prevents the releasable cover plate from being pushed away from the housing.

Only one releasable cover plate is required; the other cover plate on the opposite end may be firmly fixed to the housing. This second cover plate is constructed similarly to the releasable cover plate, having the first section that covers the open end face and a second section that is insertable into the housing. Rather than the groove that is filled with the hot-melt material, however, bores are provided that extend orthogonally into the housing and the second section of the cover plate, and which receive locating pins that securely affix the second cover plate to the housing. Preferably, three locating pins are used for this purpose, each offset at an angle of 120° to each other with regard to the circumferential geometry of the cross-section of the housing.

Variations are also conceivable, in which the second section of the cover plates is not located inside of the housing, but rather, the cover plates are formed in the manner of a cap, and each second section of the cover plates is placed over an end of the housing.

In order to ensure high contact safety, even with an activated excess temperature protection element, both the plug and socket, i.e., the male and female connectors of the plug-in connector are surrounded by insulating sheaths, which also cover the electrical contacts of the male and female connectors, i.e. even when the housing is open.

The housing may be manufactured from a brittle material, such as ceramics or stoneware. This would allow emergency personnel to activate the the excess temperature protection elements of photovoltaic in rescue missions, for example, by means of a targeted blow with a fire ax, such as is necessary when heat from a fire has not yet reached the PV system to activate the excess temperature protection element.

The excess temperature protection element may be very easily integrated into the electrical circuit of existing photovoltaic systems, simply by providing the excess temperature protection element as an intermediate plug-in component that is compatible with already existing plug-in connectors. To this end, the connector element of the one cover plate is embodied as a socket or female connector and the connector element of the other cover plate embodied as the plug or male connector of the already existing plug-in connector.

BRIEF DESCRIPTION OF THE DRAWINGS

The present invention is described with reference to the accompanying drawings. In the drawings, like reference numbers indicate identical or functionally similar elements.

FIG. 1 is a top plan view of the excess temperature protection element according to the invention, showing a releasable cover plate.

FIG. 2 is a sectional view of the excess temperature protection element.

FIG. 3 is a bottom plan view of the excess temperature protection element, showing a fixedly assembled cover plate.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-3 illustrate an excess temperature protection element 100 according to the invention. The excess temperature protection element comprises a housing 1, the end faces of which are closed by means of a releasable cover plate 2 and a fixed cover plate 3. The housing is constructed as a cylindrical tube with open end faces. The two cover plates 2, 3 have a first section 2.1, 3.1, respectively. Each first section completely covers the open end face of the housing 1. Extending from the first sections 2.1 and 3.1 are second sections or sidewalls 2.2 and 3.2, respectively, each of which is insertable into the open end face of the housing 1. A pre-stressed spiral spring or biasing spring 4 is clamped between the cover plates and stretches through the interior of the housing, exerting an outward force on the cover plates 2, 3.

An annular groove 5 is provided in the side wall of the of the second section 2.2 of the releasable cover plate 2 and a second annular groove 6 provided in the interior side of the housing 1. The two grooves 5, 6 are positioned directly opposite each other and form a hollow annular groove around the interior wall of the housing 1. A bore 7 extends through the housing wall into the hollow space, through which a hot-melt material 8 (e.g., polyamide) may be injected into the annular groove. Under normal operating temperatures, the hot-melt material 8 is solid and forms a type of O-ring, which seals the cover plate 2 to the housing and prevents an outward displacement of the cover plate 2. The second cover plate 3 is firmly affixed to the housing 1, even at high temperatures, by means of the locating pins 9. Three bores, each offset by 120 degrees around the perimeter of the housing 1 are provided through the wall of the housing and through the second section of the fixed cover plate 3. The locating pins 9 are inserted into the bores, thereby securely holding the second cover plate 3 to the housing 1. The housing 1 is preferably constructed of a brittle material, such as a ceramic or other suitable breakable material.

A female connector 11, covered by a plastic tube, is affixed to the inner side and a standardized photovoltaic modular male connector that serves as the connector element 12 affixed to the outer side of the cover plate 2. A male connector 13 that is covered by a heat-resistant plastic material is attached to the side of the cover plate 3 facing toward the interior and a standardized photovoltaic female connector 14 is attached to the exterior side of the cover plate 3. The male and female connectors on the excess temperature protection element 100 mate with standardized photovoltaic plug-in connectors. To install the excess temperature protection element 100, all that is necessary is to open the already existing standardized plug-in connector of a photovoltaic module and insert the excess temperature protection element 100 as an intermediate component.

In case of a fire or excessive temperature, the hot-melt material 8 softens, the biasing spring 4 now pushes the cover plate 2 away from the housing 1. This causes the plug-in connection formed by the male and female connectors inside the housing to open, thereby interrupting the electrical circuit. As mentioned above, the housing is preferably made of a brittle or smashable material. It is therefore also possible to destroy the brittle housing 1 by smashing it, for example, with a blow from a fire ax. As both socket 11 and plug 13 are covered by a heat and impact resistant plastic material (Duroplast), any unintentional contact with the electrical contacts is practically excluded, even when the housing 1 is opened or smashed.

It is understood that the embodiments described herein are merely illustrative of the present invention. Variations in the construction of the excess temperature protection element may be contemplated by one skilled in the art without limiting the intended scope of the invention herein disclosed and as defined by the following claims.

What is claimed is:

1. An excess temperature protection element for photovoltaic systems having a plug-in connector rated for photovoltaic systems, the excess temperature protection element comprising:
    a plug-in connector that includes a plug and a socket;
    a housing that coaxially surrounds the plug-in connector, wherein the housing is formed as an open tube element with a first open end face and a second open end face;
    two cover plates that close the first and second open end faces, wherein at least a first cover plate is a detachable plate; and
    a pressure element that is pre-stressed and clamped in the housing between the two cover plates;
    wherein the plug is attached to an interior side of one of the cover plates, and the attached to an interior side of another of the cover plates, and wherein connector elements, each being electrically connected to the socket or the plug, respectively, are provided on the exterior sides of the cover plates;
    wherein the geometry of the housing is selected such that, when the housing is closed with the cover plates, the plug-in connector is electrically connected;
    wherein the first cover plates in a longitudinal direction of the housing has a first section, in which the diameter of the end face of the first cover plate is dimensioned such that the first cover plate completely covers the opening at the end face of the housing, and a second section on an interior face of the first cover plate, in which the diameter of the end face is selected such that the end face of the second section is insertable into the housing;
    wherein a first recess is provided in the side wall of the second section and a second recess provided in the interior side of the housing, wherein, when the housing is closed, the first recess is positioned opposite the second recess to form a groove;
    wherein an opening is provided in the wall of the housing, the bore extending into the groove; and
    wherein a hot-melt material is fillable into the groove via the opening, the hot-melt material having a melting temperature above a normal operating temperature of the PV module and remaining in a solid state under normal operating conditions, thereby preventing the first cover plate from detaching from the housing.

2. The electromechanical excess temperature protection element of claim 1, wherein the housing is a tube element with a circular cross-section, and wherein the groove is a circumferential annular groove, and the opening in the wall of the housing is a bore hole.

3. The electromechanical excess temperature protection element of claim 2, wherein the two cover plates includes a second cover plate that is firmly affixed to the housing, the second cover plate, viewed in longitudinal direction of the housing, having a first section, in which the geometry of the end face of the cover plate is selected such that the first section completely covers the opening in the end face of the housing and having a second section provided on an interior face of the second cover plate that extends as a sidewall, the diameter of the sidewall being smaller than a clearance diameter of the housing, such that the second section is insertable into the housing, and wherein the second cover plate is firmly affixed to the housing by means of locating pins provided in bores that extend orthogonally through the wall of the housing and into the sidewall of the second section of the second cover plate.

4. The electromechanical excess temperature protection element of claim 3, wherein the second cover plate is affixed with three locating pins, each of which is offset at an angle of 120 degrees relative each other around the circumference of the housing.

5. The electromechanical excess temperature protection element of claim 1, wherein insulation sheaths encase the plug and socket of the plug-in connector and cover the electrical contacts of the plug and socket, respectively, to prevent a person coming into contact with the electrical contacts, even when the excess temperature protection element is activated.

6. The electromechanical excess temperature protection element of claim 1, wherein the hot-melt material is a hot-melt adhesive.

7. The electromechanical excess temperature protection element of claim 1, wherein the housing is made from a material that is smashable with a handheld tool.

8. The electromechanical excess temperature protection element of claim 7, wherein the material is ceramics or stone ware.

9. The excess temperature protection element of claim 1 for inserting as an intermediate component into an already existing plug-in connector, wherein the connecting element of the one cover plate is constructed as a photovoltaic installation socket and the connecting element of the other cover plate is constructed as a photovoltaic installation plug, the plug and socket being connectible to a socket and plug, respectively, of the already existing plug-in connector.

* * * * *